United States Patent
Yokoyama

(10) Patent No.: US 11,204,481 B2
(45) Date of Patent: Dec. 21, 2021

(54) OPTICAL SYSTEM AND IMAGING APPARATUS INCLUDING THE SAME

(71) Applicant: CANON KABUSHIKI KAISHA, Tokyo (JP)

(72) Inventor: Takayoshi Yokoyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 16/402,011

(22) Filed: May 2, 2019

(65) Prior Publication Data

US 2019/0346660 A1 Nov. 14, 2019

(30) Foreign Application Priority Data

May 14, 2018 (JP) .............................. JP2018-093366

(51) Int. Cl.
*G02B 15/14* (2006.01)
*G02B 9/12* (2006.01)
*G02B 27/00* (2006.01)
*H04N 5/225* (2006.01)

(52) U.S. Cl.
CPC ........... *G02B 9/12* (2013.01); *G02B 27/0025* (2013.01); *H04N 5/2254* (2013.01)

(58) Field of Classification Search
CPC .. G02B 9/12; G02B 27/0025; G02B 27/4211; G02B 13/0015; G02B 13/0055; G02B 13/02; G02B 15/14; G02B 15/143; G02B 15/1431; G02B 15/143105; G02B 5/1814; G02B 27/0037; G02B 27/42; G02B 27/4233

See application file for complete search history.

(56) References Cited

U.S. PATENT DOCUMENTS

| 5,148,314 | A | 9/1992 | Chen |
| 5,982,544 | A | 11/1999 | Ogata |
| 6,052,234 | A | 4/2000 | Mukai |
| 6,097,547 | A | 8/2000 | Ogata |
| 2006/0221460 | A1 | 10/2006 | Saruwatari |
| 2012/0229921 | A1* | 9/2012 | Eguchi ........... G02B 15/143107 359/771 |

FOREIGN PATENT DOCUMENTS

| CN | 1967308 A | 5/2007 |
| CN | 101162289 A | 4/2008 |
| CN | 102129113 A | 7/2011 |
| CN | 102890336 A | 1/2013 |
| CN | 102959450 A | 3/2013 |
| CN | 107450165 A | 12/2017 |
| JP | 2012022105 A | 2/2012 |
| JP | 2012189679 A | 10/2012 |

\* cited by examiner

*Primary Examiner* — Joseph P Martinez
(74) *Attorney, Agent, or Firm* — Canon U.S.A., Inc. IP Division

(57) ABSTRACT

An optical system includes a first lens unit having positive refractive power, a second lens unit having positive refractive power that is moved during focusing, and a third lens unit having negative refractive power that are arranged in order from an object side to an image side. A distance between adjacent lens units on an optical axis of the optical system is varied during focusing. The first lens unit consists of a diffractive optical element and a negative lens that are arranged in order from the object side to the image side. The negative lens has a meniscus shape in which a concave surface faces the object side.

20 Claims, 11 Drawing Sheets

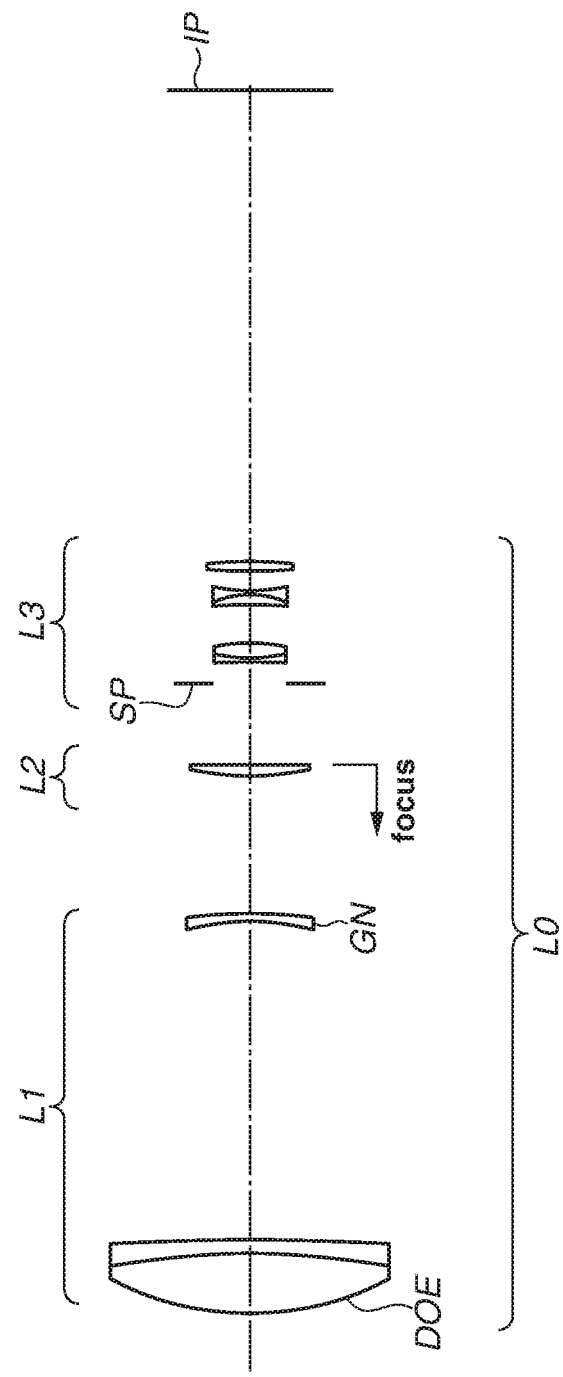

OPTICAL SYSTEM AND IMAGING APPARATUS INCLUDING THE SAME

BACKGROUND OF THE INVENTION

Field of the Invention

The present invention relates to an optical system that is suitable for a digital video camera, a digital still camera, a broadcasting camera, a silver-halide-film camera, a monitoring camera, and other imaging apparatuses.

Description of the Related Art

It is known that using a diffractive optical element as a part of an optical system makes it possible to correct chromatic aberration.

United States Patent Application Publication No. 2012/0229921 discusses, as a telephoto lens using a diffractive optical element, an optical system including a first lens unit having positive power, a second lens unit that moves in focusing, and a third lens unit. In the optical system discussed in United States Patent Application Publication No. 2012/0229921, the diffractive optical element is disposed in the first lens unit. The optical system discussed in United States Patent Application Publication No. 2012/0229921 is of a so-called inner focus type performing focusing by the second lens unit.

SUMMARY OF THE INVENTION

In an inner focus optical system, a height of a light flux passing through a focusing group is largely varied depending on a position of the focusing group. Accordingly, optical performance of the inner focus optical system is easily changed. Further, when the positive power of a first lens unit is enhanced in a case where the optical system includes a small number of lenses in order to reduce a size and a weight of the optical system, it becomes difficult to sufficiently correct aberration occurred in the first lens unit. Accordingly, it becomes difficult to achieve excellent optical performance.

The optical system discussed in United States Patent Application Publication No. 2012/0229921 is insufficient to achieve a good balance between reduction of change of the optical performance caused by an object distance and downsizing and weight reduction of the optical system.

The present invention is directed to a small-sized and lightweight optical system having excellent optical performance less changed in focusing, and to an imaging apparatus including the optical system.

According to an aspect of the present invention, an optical system includes a first lens unit having positive refractive power, a second lens unit having positive refractive power, and a third lens unit having negative refractive power that are arranged in order from an object side to an image side. During focusing, the second lens unit moves such that distances between adjacent lens units on the optical axis of the optical system change. The first lens unit consists of a diffractive optical element and a negative lens that are arranged in order from the object side to the image side, the negative lens having a meniscus shape in which a concave surface faces the object side.

Further features of the present invention will become apparent from the following description of exemplary embodiments with reference to the attached drawings.

BRIEF DESCRIPTION OF THE DRAWINGS

FIG. 1 is a cross-sectional view illustrating an optical system according to a first exemplary embodiment.

DESCRIPTION OF THE EMBODIMENTS

Figure 2A:
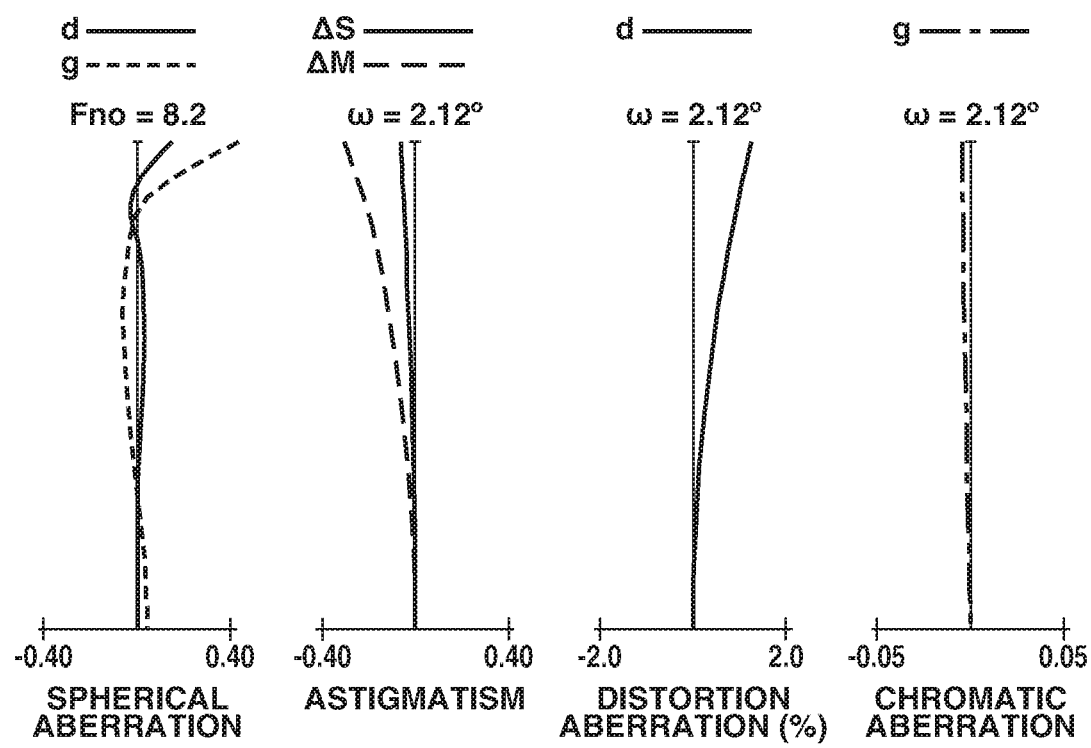
FIGS. 2A and 2B are diagrams illustrating aberrations of the optical system according to the first exemplary embodiment.
Figure 2B:
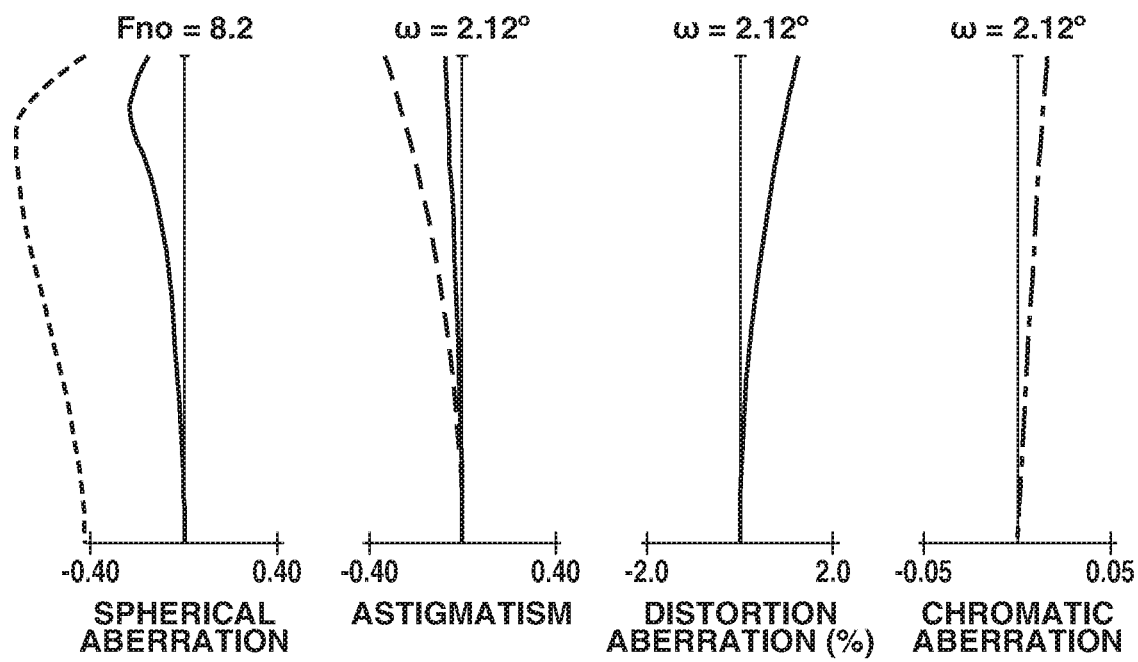
Figure 3:
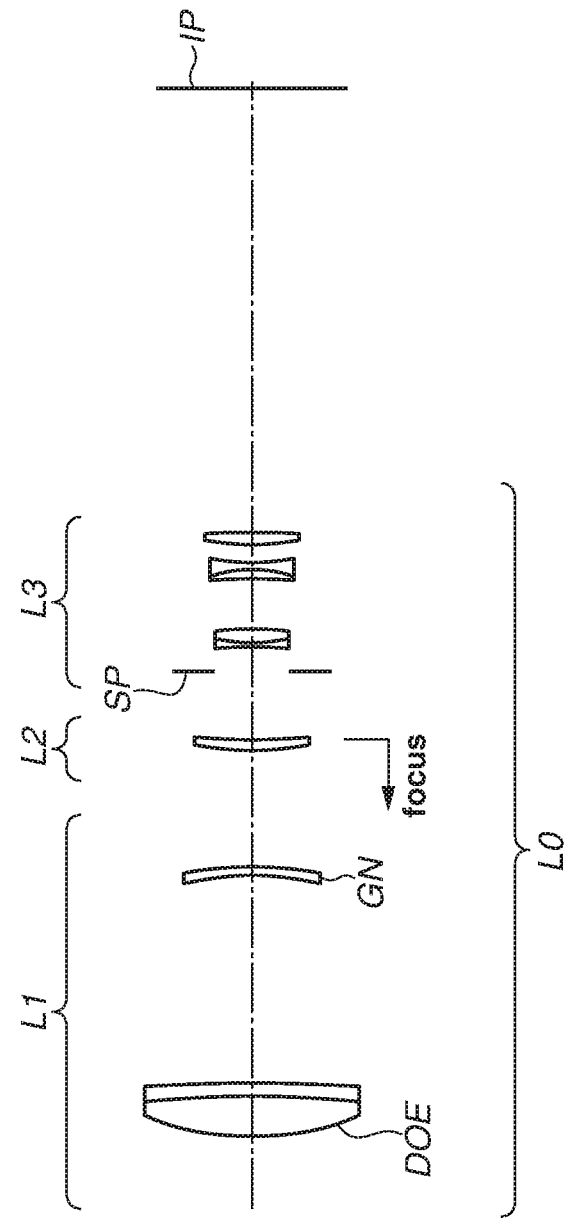
FIG. 3 is a cross-sectional view illustrating an optical system according to a second exemplary embodiment.
Figure 4A:
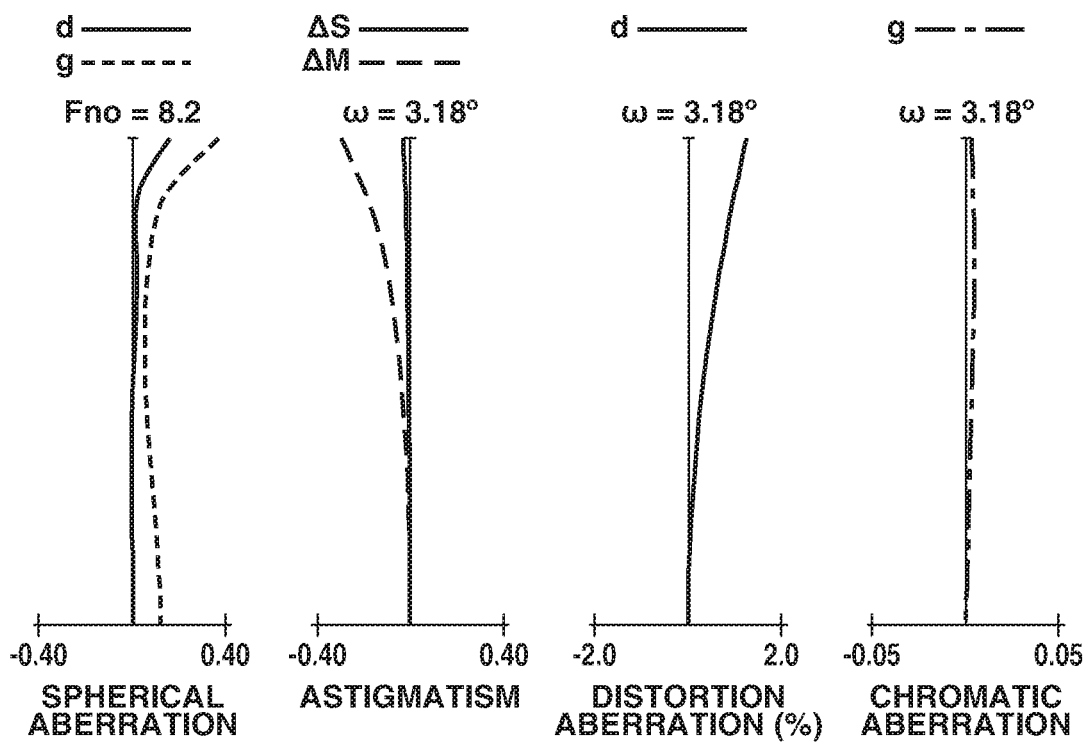
FIGS. 4A and 4B are diagrams illustrating aberrations of the optical system according to the second exemplary embodiment.
Figure 4B:
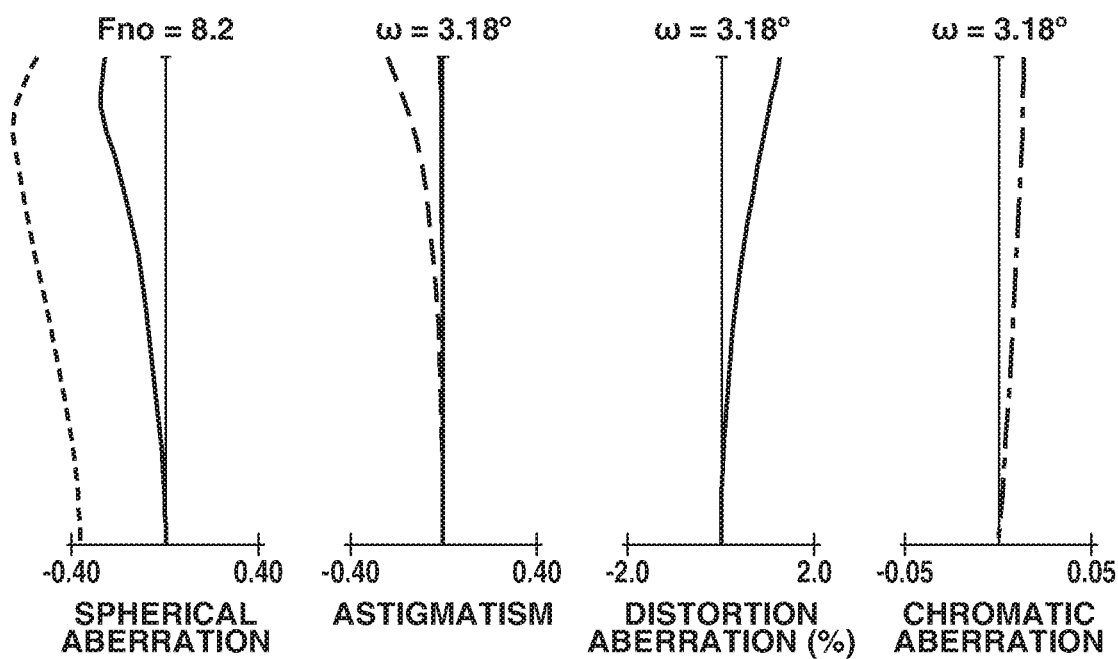
Figure 5:
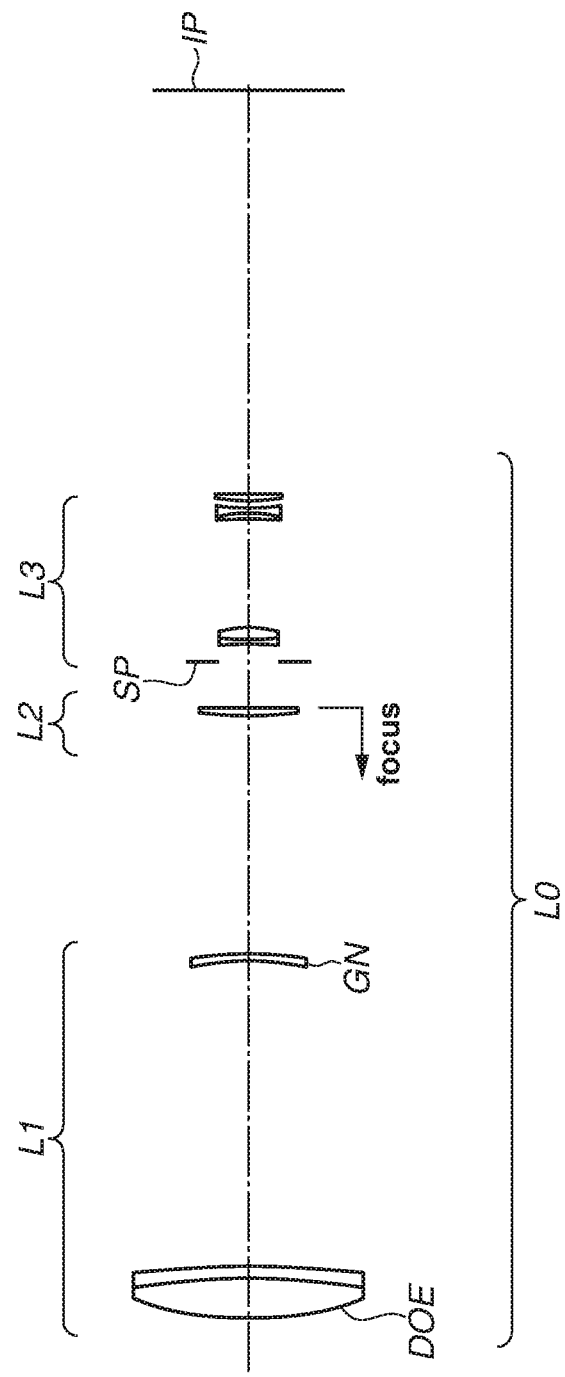
FIG. 5 is a cross-sectional view illustrating an optical system according to a third exemplary embodiment.
Figure 6A:
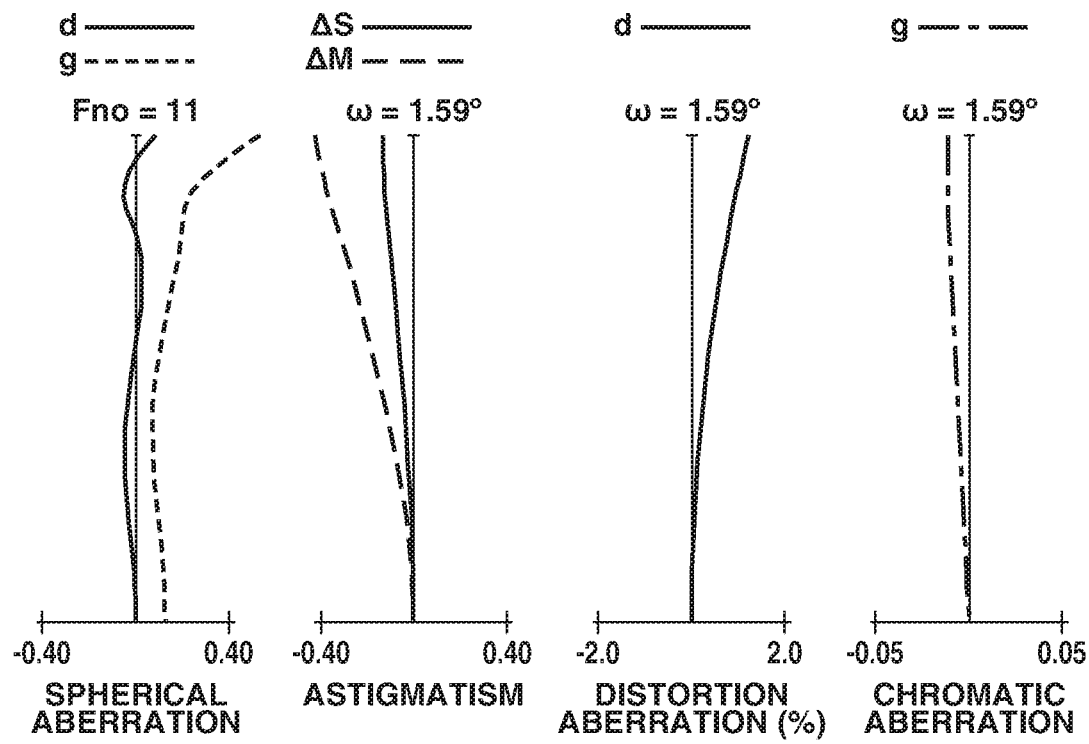
FIGS. 6A and 6B are diagrams illustrating aberrations of the optical system according to the third exemplary embodiment.
Figure 6B:
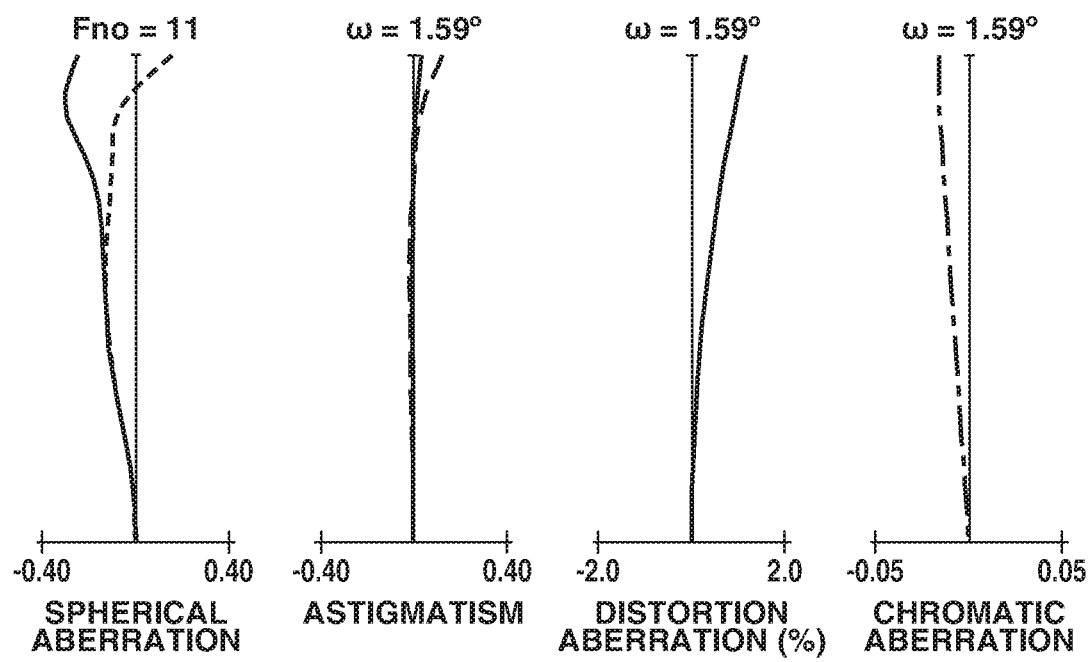
Figure 7:
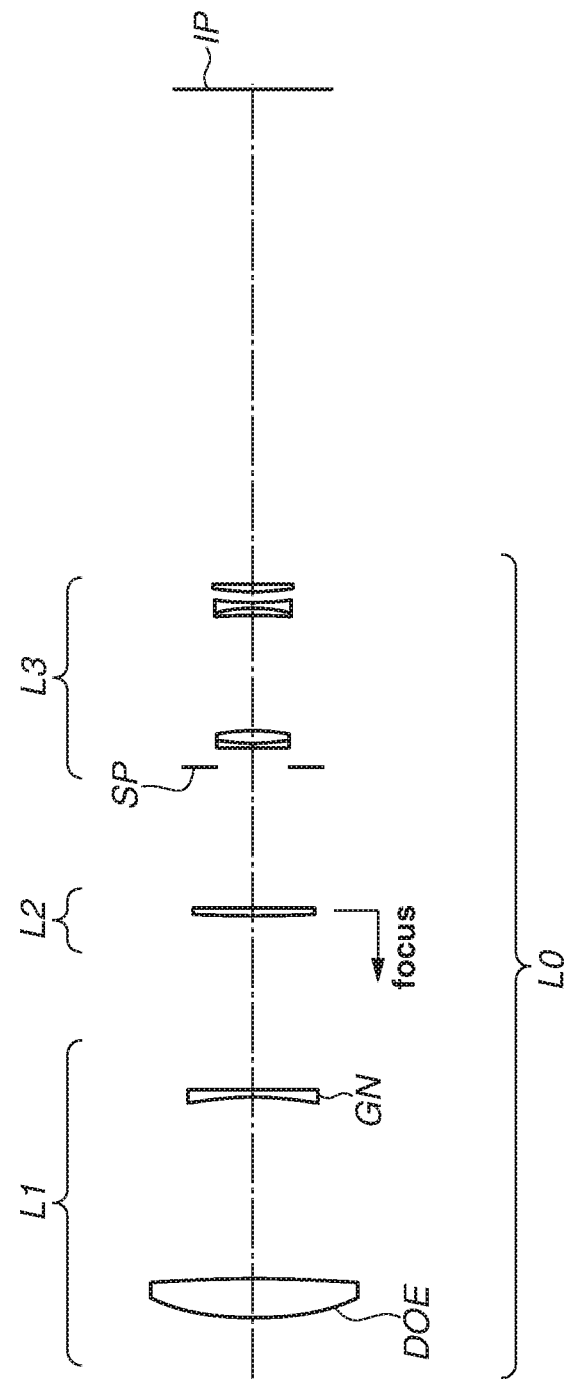
FIG. 7 is a cross-sectional view illustrating an optical system according to a fourth exemplary embodiment.
Figure 8A:
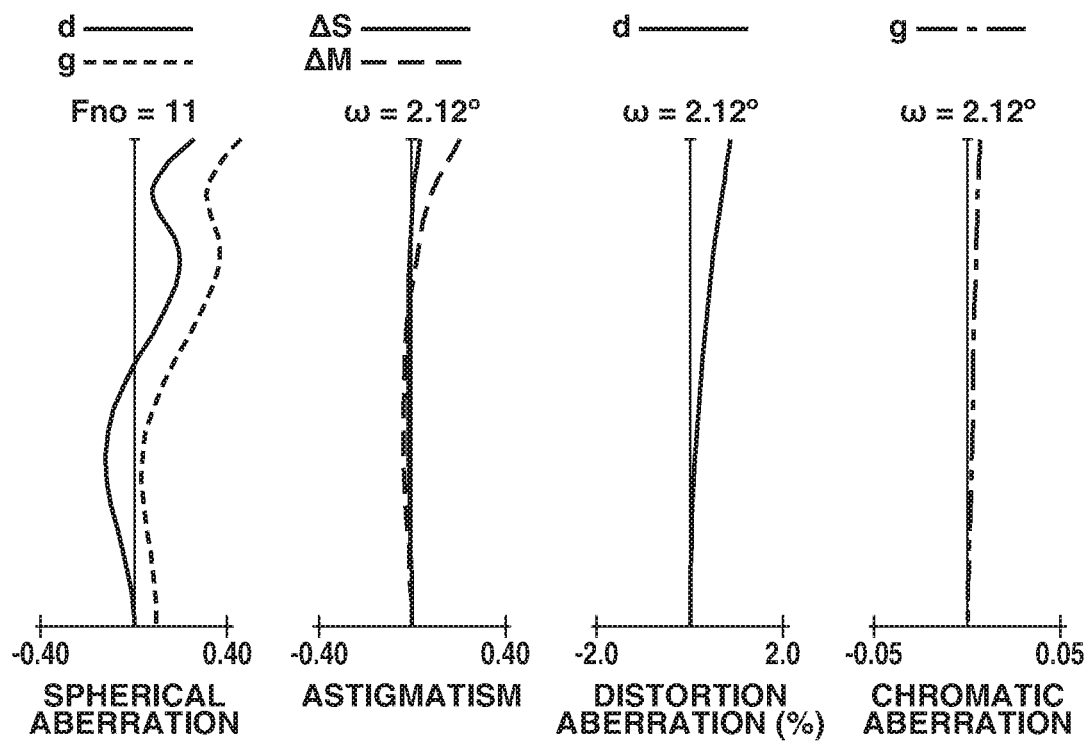
FIGS. 8A and 8B are diagrams illustrating aberrations of the optical system according to the fourth exemplary embodiment.
Figure 8B:
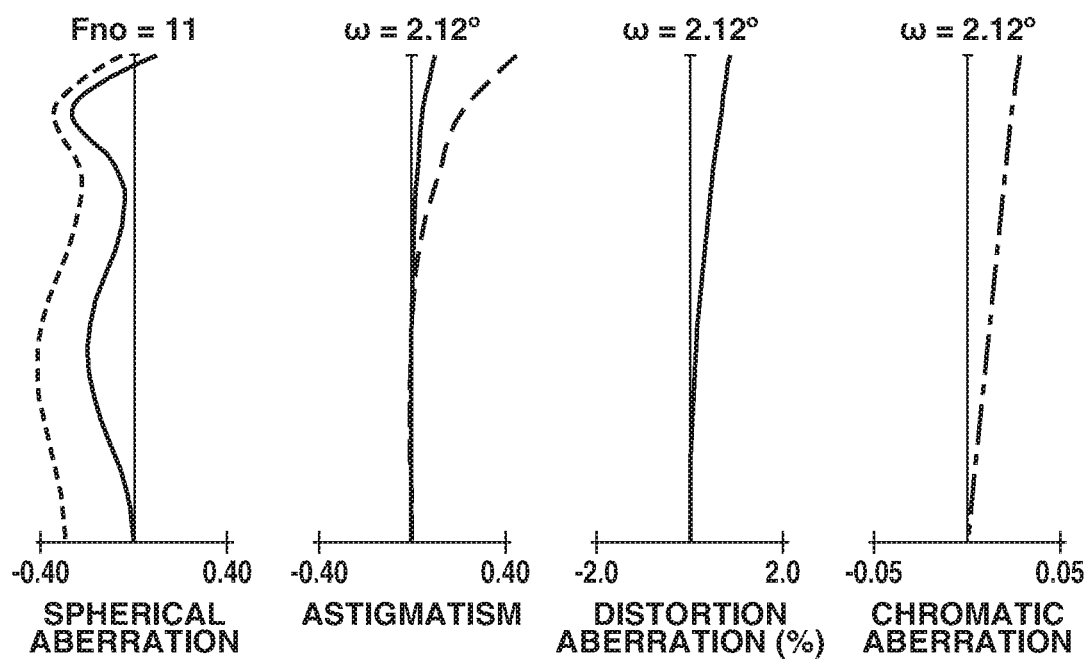
Figure 9:
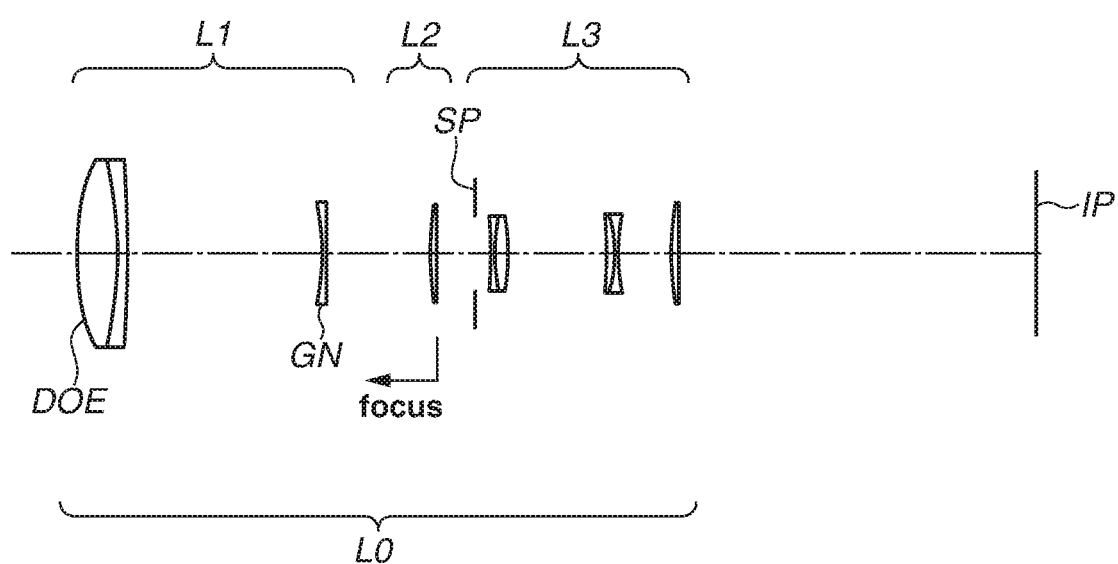
FIG. 9 is a cross-sectional view illustrating an optical system according to a fifth exemplary embodiment.
Figure 10A:
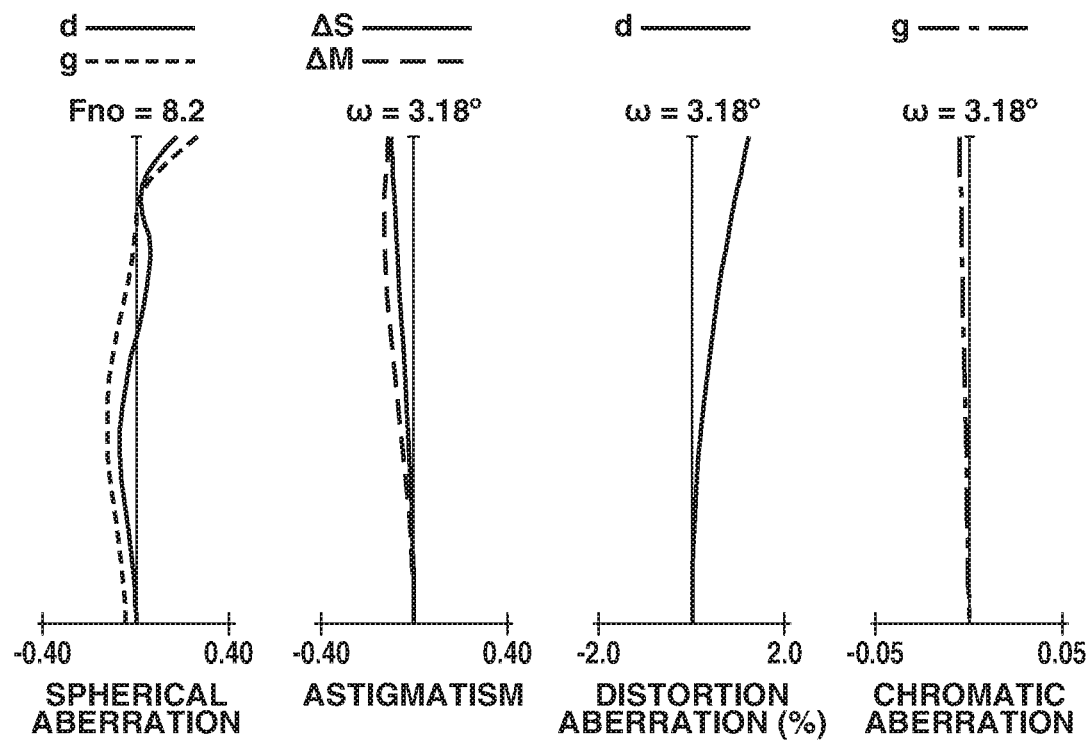
FIGS. 10A and 10B are diagrams illustrating aberrations of the optical system according to the fifth exemplary embodiment.
Figure 10B:
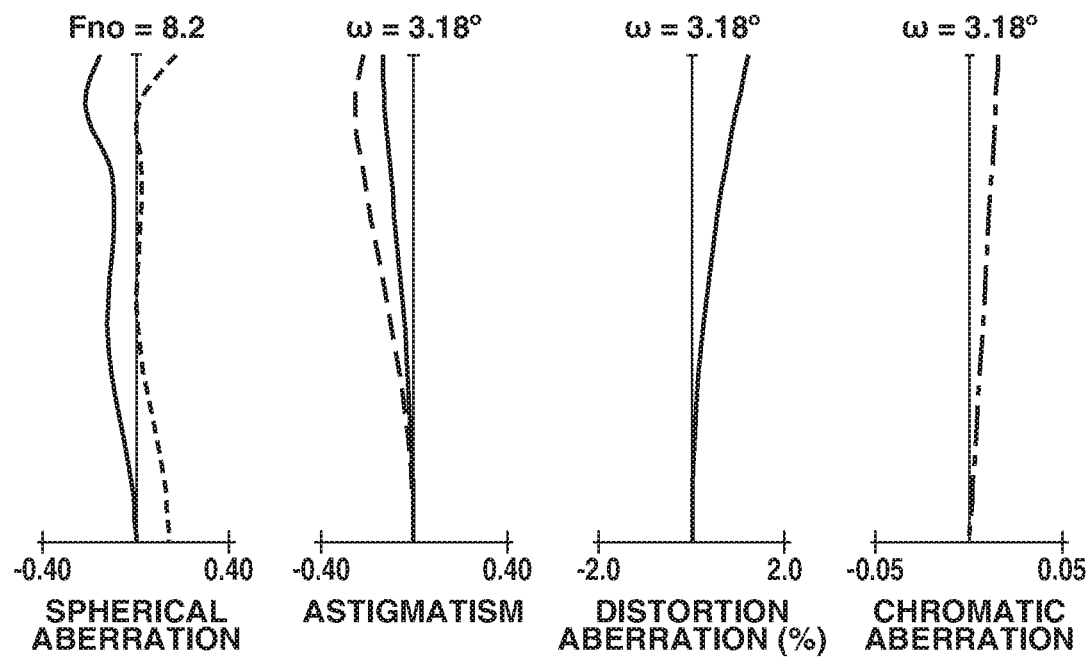

Exemplary embodiments of an optical system and an imaging apparatus including the optical system according to the present invention are described below with reference to accompanying drawings. Each of the embodiments of the present invention described below can be implemented solely or as a combination of a plurality of the embodiments or features thereof where necessary or where the combination of elements or features from individual embodiments in a single embodiment is beneficial.

The optical system according to each of the exemplary embodiments includes first and a second lens units having positive power (i.e., optical power), and a third lens unit having a negative power. The three lens units are arranged in order from the object side to the image side. When focusing is performed, the second lens unit is moved, and a distance between adjacent lens units on an optical axis is varied. Each of the lens units may include one or more lenses. Each of the lens units may include an aperture stop.

FIGS. 1, 3, 5, 7, and 9 illustrate cross-sectional views of an optical system focused on an object at infinity according to a first to fifth exemplary embodiment, respectively. The optical system according to each of the exemplary embodiments is used in an imaging apparatus such as a video camera, a digital camera, a silver-halide-film camera, and a television camera.

In each of the lens cross-sectional views, the left side corresponds to the object side, and the right side corresponds to the image side. An optical system L0 according to each of the exemplary embodiments includes a first lens unit L1, a second lens unit L2, and a third lens unit L3. The first lens unit L1 in the optical system L0 according to each of the exemplary embodiments includes a diffractive optical element DOE having positive power and a negative lens GN. The diffractive optical element DOE and the negative lens GN are arranged in order from the object side to the image side. The negative lens GN has a meniscus shape in which a concave surface of the negative lens GN faces the object side. The diffractive optical element DOE is an optical element including a diffractive surface. The diffractive optical element DOE may have the diffractive surface on a lens surface of a single lens or on a cemented surface of a cemented lens. Further, the diffractive optical element DOE may be a lens unit in which two lenses each provided with a diffractive surface are adjacently disposed with a gap such that the diffractive surfaces face each other.

Light that enters the diffractive surface of the diffractive optical element DOE is converged by light diffraction effect.

Further, in each of the lens cross-sectional views, the optical system L0 includes an aperture stop SP, and an imaging plane IP. In the optical system L0 according to each of the exemplary embodiments, the aperture stop SP is provided on the furthermost object side of the third lens unit L3. In a case where the optical system L0 according to each of the exemplary embodiments is used as an imaging optical system of a video camera or a digital camera, a solid-state imaging device (i.e., photoelectric conversion device) such as a charge-coupled device (CCD) sensor and a complementary metal-oxide semiconductor (CMOS) sensor is disposed on the imaging plane IP. In a case where the optical system L0 according to each of the exemplary embodiments is used for an imaging optical system of a silver-halide-film camera, a film is disposed on the imaging plane IP. An optical block, not illustrated, including a face plate, a low-pass filter, and an infrared cut filter may be disposed on the object side of the imaging plane IP.

An arrow illustrated in each of the lens cross-sectional views indicates a moving direction of the second lens unit L2 in focusing from infinity to a short distance. In the optical system L0 according to each of the exemplary embodiments, the second lens unit L2 moves to the object side in the focusing from infinity to a short distance.

FIGS. 2A and 2B, 4A and 4B, 6A and 6B, 8A and 8B, and 10A and 10B are diagrams illustrating aberrations of the optical system L0 according to the first to fifth exemplary embodiments, respectively. FIGS. 2A, 4A, 6A, 8A, and 10B are diagrams illustrating aberrations that occur when focusing on an object at infinity. FIGS. 2B, 4B, 6B, 8B, and 10B are diagrams illustrating aberrations that occur when focusing on an object at a finite distance (6 m in FIG. 2B, 5 m in FIG. 4B, 7 m in FIG. 6B, 6 m in FIG. 8B, and 5 m in FIG. 10B). In a spherical aberration diagram in each of the aberration diagrams, Fno denotes an F-number and indicates a spherical aberration amount with respect to a d-line (i.e., wavelength of 587.6 nm) and a g-line (i.e., wavelength of 435.8 nm). In an astigmatism diagram in each of the aberration diagrams, ΔS denotes an astigmatism amount on a sagittal imaging plane, and ΔM denotes an astigmatism amount on a meridional imaging plane. A distortion aberration (%) diagram in each of the aberration diagrams illustrates a distortion aberration amount with respect to a d-line. A chromatic aberration diagram in each of the aberration diagrams illustrates a chromatic aberration amount with respect to a g-line. In the diagrams described above, ω denotes an imaging half field angle)(°).

Next, a characteristic configuration in the optical system L0 according to each of the exemplary embodiments is described.

The optical system L0 according to each of the exemplary embodiments employs a power arrangement of telephoto type that is configured by a front group including the first lens unit L1 and the second lens unit L2 having positive composite power and a rear group including the third lens L3 unit having negative power. In this way, the optical system L0 reduces a total length of the lens.

In the optical system L0 according to each of the exemplary embodiments, the power of the front group is shared by the first lens unit L1 and the second lens unit L2. The share weakens the positive power of the first lens unit L1, which is high in height of a paraxial marginal ray and has a tendency that the spherical aberration, the coma aberration, the on-axis chromatic aberration, and other aberrations largely occur, and thus in particular, can correct high-order aberration. The share can further lower variability of optical performance caused by decentration, and thus difficulty for manufacturing can be decreased.

In addition, when the second lens unit L2 is moved in a case where focusing is performed by the second lens unit L2, a height of the light flux passing through the second lens unit L2 may be varied because the light flux converged by the first lens unit L1 enters the second lens unit L2. Accordingly, optical performance may be largely changed depending on the object distance.

In contrast, as described above, the positive power of the first lens unit L1 can be relatively weakened in the optical system L0 according to each of the exemplary embodiments. Thus, an angle of the light flux (i.e., on-axis light flux) emitted from the first lens unit L1 becomes relatively gentle. In addition, in the optical system L0 according to each of the exemplary embodiments, the first lens unit L1 includes the diffractive optical element DOE having positive power and the negative lens GN having the meniscus shape in which the concave surface is directed to the object side. Disposing the lens having negative power (i.e., the negative lens GN) on the furthermost image side in the first lens unit L1 makes it possible to make the angle of the light flux emitted from the first lens unit L1 gentler. Thus, the variation of the height of the light flux entering the second lens unit L2 is reduced when the second lens unit L2 is moved in focusing. Thus, high optical performance can be achieved.

In a case where the second lens unit L2 has positive power, the second lens unit L2 cannot correct the on-axis chromatic aberration and the magnification chromatic aberration that occur in the first lens unit L1. Accordingly, in the optical system L0 according to each of the exemplary embodiments, the diffractive optical element DOE is disposed at a position on the furthermost object side where a height of a paraxial marginal ray and a height of a paraxial chief ray become the highest in the optical system. Since the diffractive surface of the diffractive optical element DOE has negative dispersion, providing positive power to the diffractive surface makes it possible to correct the on-axis chromatic aberration and the magnification chromatic aberration that occur in the first lens unit L1. Further, providing positive power to the diffractive surface makes it possible to reduce power of the positive lens in the first lens unit L1, and to reduce the spherical aberration and the coma aberration that occurs in the first lens unit L1.

The diffractive optical element DOE can achieve an aspherical effect by changing a period of a diffractive grating. Accordingly, high optical performance can be achieved while reducing the number of positive lenses in the first lens unit L1. Thus, both light weight and high performance of the optical system L0 can be achieved.

In a case where the aspherical effect on the diffractive surface of the diffractive optical element DOE is increased to correct the spherical aberration that occurs in the positive lens in the first lens unit L1 mainly by the diffractive surface, however, chromatic spherical aberration occurs, and it becomes difficult to achieve the excellent optical performance. This is because an absolute value of the dispersion on the diffractive surface of the diffractive optical element DOE is large (vd=−3.453 in case of being converted by Abbe number with respect to d-line).

Accordingly, the negative lens GN disposed on the image side of the diffractive optical element DOE is formed in the meniscus shape in which the concave surface is directed to the object side, and the spherical aberration that occurs in the positive lens in the first lens unit L1 is corrected by the diffractive surface of the diffractive optical element DOE and the negative lens GN, and thus achieving an excellent optical performance Since the power arrangement in the first lens unit L1 forms the telephoto configuration, the total length of the lens can be reduced.

If the negative lens GN is formed in the meniscus shape in which the concave surface is directed to the image side, the spherical aberration correction effect becomes small, and thus it becomes difficult to sufficiently reduce the chromatic spherical aberration. Further, if the negative lens GN is formed in a biconcave shape, increase of the power of the positive lens in the first lens unit L1 is needed and thus achieving an excellent optical performance becomes difficult.

With the above-described configuration, the optical system L0 according to each of the exemplary embodiments can have a small size, a light weight, and the excellent optical performance less changed in focusing.

Next, a preferred configuration to be satisfied by the optical system L0 according to each of the exemplary embodiments is described.

The optical system L0 according to each of the exemplary embodiments preferably satisfies the following conditional expression (1):

$$-0.55 < f3/f < -0.06, \quad (1)$$

where f is a focal length of the optical system L0, and f3 is a focal length of the third lens unit L3.

The conditional expression (1) relates to the power of the third lens unit L3, and specifies a condition to achieve an excellent optical performance while downsizing the optical system L0.

If the negative power of the third lens unit L3 is increased (i.e., absolute value of power is increased) beyond an upper limit of the conditional expression (1), a tendency of asymmetric telephoto power arrangement is remarkably enhanced, and off-axis aberration such as field curvature and distortion aberration is increased, which is not preferable.

If the negative power of the third lens unit L3 is decreased (i.e., absolute value of power is decreased) beyond a lower limit of the conditional expression (1), the tendency of the telephoto power arrangement is weakened, which makes it difficult to sufficiently downsize the optical system L0.

The range of the conditional expression (1) is preferably set to a range of the following conditional expression (1a), and is more preferably set to a range of the following conditional expression (1b):

$$-0.52 < f3/f < -0.08, \quad (1a)$$

$$-0.48 < f3/f < -0.10. \quad (1b)$$

Further, the optical system L0 according to each of the exemplary embodiments preferably satisfies the following conditional expression (2):

$$0.50 < f1/f < 1.00, \quad (2)$$

where f1 is a focal length of the first lens unit L1.

The conditional expression (2) relates to the power of the first lens unit L1, and specifies a condition to achieve a high optical performance while downsizing the optical system L0.

If the power of the first lens unit L1 becomes so small as to exceed an upper limit of the conditional expression (2), tendency of telephoto power arrangement is weakened, which makes it difficult to sufficiently downsize the optical system L0.

If the power of the first lens unit L1 becomes so large as to exceed a lower limit of the conditional expression (2), the spherical aberration, the coma aberration, the on-axis chromatic aberration, and the magnification chromatic aberration that occur in the first lens unit L1 excessively increases. Thus, it becomes difficult to correct the aberrations by the second lens unit L2 and the third lens unit L3, and to achieve an excellent optical performance. Further, as a result of strong convergence of the incident light flux by the first lens unit L1, it becomes difficult to correct the change of the optical performance when the second lens unit L2 is moved in focusing.

The range of the conditional expression (2) is preferably set to a range of the following conditional expression (2a), and is more preferably set to a range of the following conditional expression (2b):

$$0.55 < f1/f < 0.98, \quad (2a)$$

$$0.58 < f1/f < 0.95. \quad (2b)$$

Further, the optical system L0 according to each of the exemplary embodiments preferably satisfies the following conditional expression (3):

$$0.40 < L/f < 0.70, \quad (3)$$

where L is a total length of the optical system L0.

The conditional expression (3) relates to a telephoto ratio of the optical system L0.

If the total length of the optical system L0 becomes so long as compared with the focal length of the total system as to exceed an upper limit of the conditional expression (3), it becomes difficult to downsize the optical system L0.

If the total length of the optical system L0 becomes so short as to exceed a lower limit of the conditional expression (3), the spherical aberration, the coma aberration, the on-axis chromatic aberration, and the magnification chromatic aberration that occur in the positive lens in the first lens unit L1 become excessively large. To satisfactorily correct the aberrations, it is necessary to increase the number of lenses in the first lens unit L1, which makes it difficult to achieve sufficiently high optical performance while downsizing the optical system with light weight.

The range of the conditional expression (3) is preferably set to a range of the following conditional expression (3a), and is more preferably set to a range of the following conditional expression (3b):

$$0.44 < L/f < 0.68, \quad (3a)$$

$$0.48 < L/f < 0.65. \quad (3b)$$

Further, the optical system L0 according to each of the exemplary embodiments preferably satisfies the following conditional expression (4):

$$0.18 < f2/f < 0.75, \quad (4)$$

where f2 a focal length of the second lens unit L2.

The conditional expression (4) relates to the power of the second lens unit L2, and specifies a condition to reduce the change of the optical performance in focusing while downsizing the optical system L0.

If the power of the second lens unit L2 becomes so small as to exceed an upper limit of the conditional expression (4), a moving length of the second lens unit in focusing becomes excessively large, and thus the optical system L0 is upsized, which is not preferable.

If the power of the second lens unit L2 becomes so large as to exceed a lower limit of the conditional expression (4), the aberration that occurs in the second lens unit L2 is increased. Thus, even when the incident angle of the light flux to the second lens unit L2 is made gentle, the variation of the optical performance in focusing becomes large, which makes it difficult to achieve an excellent optical performance.

The range of the conditional expression (4) is preferably set to a range of the following conditional expression (4a), and is more preferably set to a range of the following conditional expression (4b):

$$0.20 < f2/f < 0.70, \quad (4a)$$

$$0.25 < f2/f < 0.65. \quad (4b)$$

Further, the optical system L0 according to each of the exemplary embodiments preferably satisfies the following conditional expression (5):

$$-1.00 < fn/f < -0.15, \quad (5)$$

where fn is a focal length of the negative lens GN of the first lens unit L1.

The conditional expression (5) specifies a condition to further downsize the optical system L0 while reducing the aberration fluctuation in focusing.

If the negative power of the negative lens GN becomes so large (i.e., absolute value of the power becomes large) as to exceed an upper limit of the conditional expression (5), high-order spherical aberration and high-order coma aberration occur in the negative lens GN, which makes it difficult to achieve high optical performance.

If the negative power of the negative lens GN becomes so small (i.e., absolute value of the power becomes small) as to exceed a lower limit of the conditional expression (5), it becomes difficult to reduce the change of the optical performance in focusing. Further, since effect of total length reduction by the telephoto arrangement in the first lens unit L1 is reduced, it becomes difficult to reduce the total length of the lens.

The range of the conditional expression (5) is preferably set to a range of the following conditional expression (5a), and is more preferably set to a range of the following conditional expression (5b):

$$-0.95 < fn/f < -0.18, \quad (5a)$$

$$-0.92 < fn/f < -0.20. \quad (5b)$$

Further, the optical system L0 according to each of the exemplary embodiments preferably satisfies the following conditional expression (6):

$$27.0 < vn < 41.0, \quad (6)$$

where vn is an Abbe number with respect to a d-line of the negative lens GN.

The conditional expression (6) relates to the chromatic aberration that occurs in the negative lens GN. In the optical system L0 according to each of the exemplary embodiments, the first lens unit L1 includes only the diffractive optical element DOE and the negative lens GN. In addition, the second lens unit L2 has positive power. In such a configuration, a negative power component in the front group is small as compared with a configuration in which the second lens unit has negative power. Accordingly, the diffractive optical element DOE and the negative lens GN need to have appropriate chromatic aberration so as to correct the on-axis chromatic aberration and the magnification chromatic aberration that occur in the first lens unit L1 in the front group.

If the Abbe number of the negative lens GN becomes so large as to exceed an upper limit of the conditional expression (6), assignment of correcting the chromatic aberration to the diffractive optical element DOE is increased, and thus high-order chromatic spherical aberration easily occurs. As a result, it becomes difficult to achieve high optical performance.

If the Abbe number of the negative lens GN becomes so small as to exceed a lower limit of the conditional expression (6), high-order chromatic aberration that occurs in the negative lens GN is increased and it becomes difficult to suppress the change of the optical performance in focusing, which is not preferable.

The range of the conditional expression (6) is preferably set to a range of the following conditional expression (6a), and is more preferably set to a range of the following conditional expression (6b):

$$27.5 < vn < 38.0, \quad (6a)$$

$$28.0 < vn < 35.0. \quad (6b)$$

Further, the optical system L0 according to each of the exemplary embodiments preferably satisfies the following conditional expression (7):

$$20.0 < fdoe/f < 40.0, \quad (7)$$

where fdoe is a focal length of the diffractive surface of the diffractive optical element DOE by diffractive effect.

The conditional expression (7) relates to the power of the diffractive optical element DOE by diffraction, and specifies a condition to achieve an excellent optical performance.

The focal length fdoe of the diffractive surface of the diffractive optical element DOE by the diffraction effect is described. A phase $\Phi(H)$ of the diffractive surface at a position of a height H from the optical axis is provided by the following expression (A):

$$\Phi(H) = (2\pi \times m/\lambda_0) \times (C_2 \times H^2 + C_4 \times H^4 + \ldots + C_{2n} \times H^{2n}), \quad (A)$$

where m is a diffraction order, $\lambda_0$ is a reference wavelength, and $C_{2n}$ is a phase coefficient (n is integer of one or more).

Further, optical power $\phi_D$ of paraxial first-order diffracted light (m=1) at the reference wavelength $\lambda_0$ on the diffractive surface is expressed by $\phi_D = -2C_2$. Thus, the focal length fdoe only by the diffraction component of a diffractive optical unit of the diffractive optical element DOE is provided by the following expression (B):

$$fdoe = 1/\phi_D = -1/(2 \times C_2). \quad (B)$$

If the power of the diffractive surface becomes so small as to exceed an upper limit of the conditional expression (7), it becomes difficult to correct the on-axis chromatic aberration and the magnification chromatic aberration.

If the power of the diffractive surface becomes so large as to exceed a lower limit of the conditional expression (7), the on-axis chromatic aberration and the magnification chromatic aberration are excessively corrected, which is not preferable. Further, in a case where the aspherical effect is provided on the diffractive surface for correcting the spherical aberration, the chromatic spherical aberration excessively occurs, which is not preferable.

The range of the conditional expression (7) is preferably set to a range of the following conditional expression (7a), and is more preferably set to a range of the following conditional expression (7b):

$$22.0 < fdoe/f < 36.0, \quad (7a)$$

$$25.0 < fdoe/f < 33.0. \quad (7b)$$

Further, the optical system L0 according to each of the exemplary embodiments preferably satisfies the following conditional expression (8):

$$0.10 < skd/f < 0.40, \quad (8)$$

where skd is the back focus of the optical system L0.

The conditional expression (8) relates to the back focus of the optical system L0. If the front group (i.e., the first lens unit L1 and the second lens unit L2) having positive power and the rear group (i.e., the third lens unit L3) having negative power are adjacently arranged, the power of the front group and the rear group are increased, and thus the total length of the lens can be reduced through a shift of an image side principal point position to the object side.

If the value of skd/f becomes so large as to exceed a lower limit of the conditional expression (8), the distance between the front group (i.e., the first lens unit L1 and the second lens unit L2) and the rear group (i.e., the third lens unit) is increased, and the power of each of the lens units is also decreased. Thus, it is difficult to reduce the total length of the lens.

If the value of skd/f becomes so small as to exceed an upper limit of the conditional expression (8), the power of each of the groups becomes excessively high, and thus it is difficult to achieve high optical performance.

The range of the conditional expression (8) is preferably set to a range of the following conditional expression (8a), and is more preferably set to a range of the following conditional expression (8b):

$$0.12 < skd/f < 0.35, \quad (8a)$$

$$0.14 < skd/f < 0.30. \quad (8b)$$

Next, a detailed configuration in the optical system L0 according to each of the exemplary embodiments is described.

A configuration of the diffractive optical element DOE according to each of the exemplary embodiments is described. In the first, second, third, and fifth exemplary embodiments, the diffractive optical element DOE includes a biconvex lens and a negative lens. The negative lens is cemented on the image side of the biconvex lens and has a meniscus shape in which a concave surface thereof is directed to the object side. The diffractive surface of the diffractive optical element DOE is provided on a cemented surface thereof. In the fourth exemplary embodiment, the diffractive optical element DOE includes a biconvex lens having the diffractive surface on the image side.

The second lens unit L2 is described. In each of the exemplary embodiments, the second lens unit L2 includes only one positive lens. Since the second lens unit L2 includes only one positive lens, the weight of the second lens unit L2 is reduced. Thus, focusing can be performed at high speed.

The third lens unit L3 is described. In the optical system L0 according to each of the exemplary embodiments, image stabilization can be achieved by moving a part of the lenses included in the third lens unit L3 perpendicularly to the optical axis. In each of the exemplary embodiments, the image stabilization is performed by moving a cemented lens, which is included in the third lens unit L3, perpendicularly to the optical axis. The cemented lens includes a biconcave lens and a positive lens having a meniscus shape in which the convex surface is directed to the image side.

First to fifth numerical examples respectively corresponding to the first to fifth exemplary embodiments are described below.

In surface data of each of the numerical examples, r denotes a radius of curvature of each optical surface, and d in millimeters (mm) denotes an on-axis interval (i.e., distance on optical axis) between the m-th surface and the (m+1)-th surface, where m is a surface number counted from a light incident side. Further, nd denotes a refractive index of each of the optical members with respect to the d-line, and vd denotes an Abbe number of each of the optical members.

In each of the numerical examples, an on-axis interval d, a focal length in millimeters (mm), an F-number, and a half field angle in degrees)(°) are all values when the optical system according to each of the exemplary embodiments focuses on an object at infinity. The back focus BF is a distance from the final lens surface to the imaging plane. The total length of the lens (i.e., total length L of the optical system L0) is a value obtained by adding the back focus to the distance from the first lens surface to the final lens surface.

In the surface data according to each of the numerical examples, the optical surface serving as the diffractive surface is added with (diffraction) after the surface number.

First Numerical Example

Unit mm

Surface Data

| Surface Number | r | d | nd | vd | Effective Aperture |
|---|---|---|---|---|---|
| 1 | 78.602 | 15.51 | 1.48749 | 70.2 | 71.34 |
| 2 (diffraction) | −209.211 | 3.50 | 1.83481 | 42.7 | 70.04 |
| 3 | −738.700 | 83.55 | | | 68.93 |
| 4 | −59.111 | 2.00 | 1.90366 | 31.3 | 32.54 |
| 5 | −125.999 | (variable) | | | 32.74 |
| 6 | 91.988 | 3.13 | 1.54072 | 47.2 | 30.00 |
| 7 | −1133.476 | (variable) | | | 29.66 |
| 8 (diaphragm) | infinite | 5.53 | | | 19.19 |
| 9 | −100.065 | 1.00 | 1.90043 | 37.4 | 17.53 |
| 10 | 39.579 | 3.92 | 1.51742 | 52.4 | 17.34 |
| 11 | −39.790 | 10.22 | | | 17.35 |
| 12 | −66.970 | 2.16 | 2.00100 | 29.1 | 17.75 |
| 13 | −26.838 | 1.32 | 1.77250 | 49.6 | 17.97 |
| 14 | 53.830 | 4.67 | | | 18.37 |
| 15 | 62.566 | 2.77 | 1.59270 | 35.3 | 20.69 |
| 16 | −142.343 | 123.14 | | | 20.94 |
| Imaging Plane | infinite | | | | |

Diffractive Surface Data
Second Surface (Diffractive Surface)

C2 = −3.29884e−005, C4 = 4.36686e−009, C6 = −7.88819e−013,
C8 = −7.31492e−016, C10 = 3.22851e−019

Various Kinds of Data

| | |
|---|---|
| Focal Length | 585.00 |
| F-Number | 8.20 |
| Half Field Angle (°) | 2.12 |
| Image Height | 21.64 |

Unit mm

| | |
|---|---|
| Total Length of Lens | 319.25 |
| BF | 123.14 |

| | Focusing on Object at Infinity | Focusing on Object at Distance of 6 m |
|---|---|---|
| d5 | 35.74 | 24.90 |
| d7 | 21.10 | 31.94 |

| | |
|---|---|
| Position of Entrance Pupil | 673.19 |
| Position of Exit Pupil | −29.25 |
| Front Principal Point Position | −987.42 |
| Rear Principal Point Position | −461.86 |

Lens Unit Data

| Lens Unit | Starting Surface | Focal Length | Lens Structure Length | Front Principal Point Position | Rear Principal Point Position |
|---|---|---|---|---|---|
| L1 | 1 | 464.67 | 104.56 | −355.11 | −257.25 |
| L2 | 6 | 157.49 | 3.13 | 0.15 | −1.88 |
| L3 | 8 | −92.36 | 31.58 | 1.89 | −27.40 |

Second Numerical Example

Unit mm

Surface Data

| Surface Number | r | d | nd | vd | Effective Aperture |
|---|---|---|---|---|---|
| 1 | 70.844 | 9.01 | 1.48749 | 70.2 | 47.56 |
| 2 (diffraction) | −303.177 | 3.00 | 1.80610 | 33.3 | 46.64 |
| 3 | −738.700 | 47.54 | | | 46.06 |
| 4 | −65.330 | 2.00 | 1.90366 | 31.3 | 29.87 |
| 5 | −83.586 | (variable) | | | 29.98 |
| 6 | 65.692 | 2.44 | 1.51633 | 64.1 | 24.99 |
| 7 | 135.525 | (variable) | | | 24.48 |
| 8 (diaphragm) | infinite | 5.53 | | | 17.07 |
| 9 | −344.288 | 1.00 | 1.95375 | 32.3 | 15.19 |
| 10 | 31.093 | 3.35 | 1.51742 | 52.4 | 14.88 |
| 11 | −62.419 | 11.45 | | | 14.92 |
| 12 | −58.776 | 2.19 | 2.00100 | 29.1 | 16.58 |
| 13 | −23.279 | 1.32 | 1.77250 | 49.6 | 16.83 |
| 14 | 45.467 | 4.23 | | | 17.37 |
| 15 | 53.077 | 2.81 | 1.64769 | 33.8 | 19.96 |
| 16 | −153.513 | 101.37 | | | 20.25 |
| Imaging Plane | infinite | | | | |

Diffractive Surface Data
Second Surface (Diffractive Surface)

$C2 = -4.67285e-005$, $C4 = 1.06360e-008$, $C6 = -2.54280e-012$, $C8 = -1.35285e-014$, $C10 = 1.20444e-017$

Various Kinds of Data

| | |
|---|---|
| Focal Length | 390.00 |
| F-Number | 8.20 |
| Half Field Angle (°) | 3.18 |
| Image Height | 21.64 |
| Total Length of Lens | 239.25 |
| BF | 101.37 |

| | Focusing on Object at Infinity | Focusing on Object at Distance of 5 m |
|---|---|---|
| d5 | 26.47 | 18.35 |
| d7 | 15.55 | 23.67 |

| | |
|---|---|
| Position of Entrance Pupil | 282.61 |
| Position of Exit Pupil | −29.47 |
| Front Principal Point Position | −489.88 |
| Rear Principal Point Position | −288.63 |

Lens Unit Data

| Lens Unit | Starting Surface | Focal Length | Lens Structure Length | Front Principal Point Position | Rear Principal Point Position |
|---|---|---|---|---|---|
| L1 | 1 | 193.96 | 61.55 | −27.92 | −74.23 |
| L2 | 6 | 244.01 | 2.44 | −1.50 | −3.09 |
| L3 | 8 | −70.85 | 31.86 | 4.14 | −25.56 |

Third Numerical Example

Unit mm

Surface Data

| Surface Number | r | d | nd | vd | Effective Aperture |
|---|---|---|---|---|---|
| 1 | 113.931 | 13.16 | 1.48749 | 70.2 | 70.91 |
| 2 (diffraction) | −176.722 | 3.50 | 1.80400 | 46.6 | 70.06 |
| 3 | −331.361 | 96.70 | | | 69.53 |
| 4 | −87.176 | 2.00 | 1.95375 | 32.3 | 35.42 |
| 5 | −192.131 | (variable) | | | 35.52 |
| 6 | 158.595 | 2.81 | 1.51633 | 64.1 | 29.71 |
| 7 | −347.032 | (variable) | | | 29.46 |
| 8 (diaphragm) | infinite | 5.53 | | | 19.29 |
| 9 | −76.700 | 1.00 | 1.88300 | 40.8 | 18.02 |
| 10 | 44.414 | 4.13 | 1.51742 | 52.4 | 17.96 |
| 11 | −33.981 | 34.47 | | | 18.11 |
| 12 | −73.377 | 2.12 | 2.00069 | 25.5 | 18.67 |
| 13 | −29.742 | 1.32 | 1.77250 | 49.6 | 18.85 |
| 14 | 56.213 | 2.00 | | | 19.18 |
| 15 | 59.880 | 2.57 | 1.58144 | 40.8 | 20.07 |
| 16 | −238.984 | 127.73 | | | 20.29 |
| Imaging Plane | infinite | | | | |

Diffractive Surface Data
Second Surface (Diffractive Surface)

$C2 = -2.22456e-005$, $C4 = 1.67106e-009$, $C6 = 6.28781e-013$, $C8 = -1.09699e-015$, $C10 = 3.78650e-019$

Various Kinds of Data

| | |
|---|---|
| Focal Length | 780.00 |
| F-Number | 11.00 |
| Half Field Angle (°) | 1.59 |
| Image Height | 21.64 |
| Total Length of Lens | 389.25 |
| BF | 127.73 |

| | Focusing on Object at Infinity | Focusing on Object at Distance of 7 m |
|---|---|---|
| d5 | 75.53 | 59.45 |
| d7 | 14.68 | 30.77 |

| | |
|---|---|
| Position of Entrance Pupil | 892.94 |
| Position of Exit Pupil | −41.29 |
| Front Principal Point Position | −1926.54 |
| Rear Principal Point Position | −652.27 |

Lens Unit Data

Lens

-continued

Unit mm

| Lens Unit | Starting Surface | Focal Length | Structure Length | Front Principal Point Position | Rear Principal Point Position |
|---|---|---|---|---|---|
| L1 | 1 | 488.71 | 115.36 | −300.36 | −253.34 |
| L2 | 6 | 211.21 | 2.81 | 0.58 | −1.27 |
| L3 | 8 | −84.82 | 53.14 | 20.32 | −24.90 |

Fourth Numerical Example

Unit mm

Surface Data

| Surface Number | r | d | nd | vd | Effective Aperture |
|---|---|---|---|---|---|
| 1 | 82.611 | 10.67 | 1.48749 | 70.2 | 55.03 |
| 2 (diffraction) | −382.988 | 49.69 | | | 53.93 |
| 3 | −80.743 | 2.00 | 1.80610 | 33.3 | 34.06 |
| 4 | −492.100 | (variable) | | | 33.98 |
| 5 | 211.302 | 2.51 | 1.51742 | 52.4 | 32.02 |
| 6 | −1159.477 | (variable) | | | 31.81 |
| 7 (diaphragm) | infinite | 5.53 | | | 19.14 |
| 8 | −4485.184 | 1.00 | 1.90043 | 37.4 | 18.09 |
| 9 | 43.868 | 3.53 | 1.51742 | 52.4 | 17.90 |
| 10 | −65.315 | 31.59 | | | 17.86 |
| 11 | −78.086 | 2.04 | 2.00100 | 29.1 | 18.62 |
| 12 | −32.066 | 1.32 | 1.77250 | 49.6 | 18.79 |
| 13 | 62.309 | 2.97 | | | 19.11 |
| 14 | −65.732 | 2.51 | 1.59270 | 35.3 | 20.37 |
| 15 | −257.055 | 134.40 | | | 20.57 |
| Imaging Plane | infinite | | | | |

Diffractive Surface Data
Second Surface (Diffractive Surface)

C2 = −2.71139e−005, C4 = −5.97321e−009, C6 = 1.52580e−011,
C8 = −2.83014e−014, C10 = 1.67271e−017

Various Kinds of Data

| Focal Length | 585.00 |
|---|---|
| F-Number | 10.99 |
| Half Field Angle (°) | 2.12 |
| Image Height | 21.64 |
| Total Length of Lens | 334.87 |
| BF | 134.40 |

| | Focusing on Object at Infinity | Focusing on Object at Distance of 6 m |
|---|---|---|
| d4 | 46.96 | 26.32 |
| d6 | 38.13 | 58.77 |

| Position of Entrance Pupil | 477.43 |
|---|---|
| Position of Exit Pupil | −41.60 |
| Front Principal Point Position | −881.96 |
| Rear Principal Point Position | −450.59 |

Lens Unit Data

| Lens Unit | Starting Surface | Focal Length | Lens Structure Length | Front Principal Point Position | Rear Principal Point Position |
|---|---|---|---|---|---|
| L1 | 1 | 464.67 | 62.37 | −212.97 | −185.89 |
| L2 | 5 | 345.64 | 2.51 | 0.26 | −1.40 |
| L3 | 7 | −139.92 | 50.49 | 25.77 | −19.84 |

Fifth Numerical Example

Unit mm

Surface Data

| Surface Number | r | d | nd | vd | Effective Aperture |
|---|---|---|---|---|---|
| 1 | 65.475 | 10.66 | 1.48749 | 70.2 | 47.56 |
| 2 (diffraction) | −105.351 | 2.50 | 1.67790 | 55.3 | 46.66 |
| 3 | −269.692 | 50.88 | | | 45.96 |
| 4 | −62.366 | 1.40 | 1.72825 | 28.5 | 25.46 |
| 5 | −535.670 | (variable) | | | 25.35 |
| 6 | 127.047 | 1.62 | 1.51742 | 52.4 | 24.14 |
| 7 | 12888.359 | (variable) | | | 24.00 |
| 8 (diaphragm) | infinite | 3.69 | | | 18.95 |
| 9 | −163.699 | 1.10 | 1.69680 | 55.5 | 18.21 |
| 10 | 36.526 | 3.26 | 1.51742 | 52.4 | 18.00 |
| 11 | −59.263 | 25.51 | | | 17.96 |
| 12 | −345.769 | 2.54 | 1.80610 | 33.3 | 19.32 |
| 13 | −35.434 | 1.10 | 1.77250 | 49.6 | 19.43 |
| 14 | 62.052 | 13.52 | | | 19.66 |
| 15 | 77.810 | 2.12 | 1.57501 | 41.5 | 24.95 |
| 16 | 1643.939 | 92.99 | | | 25.08 |
| Imaging Plane | infinite | | | | |

Diffractive Surface Data
Second Surface (Diffractive Surface)

C2 = −4.19396e−005, C4 = 3.13194e−009, C6 = 2.06084e−011,
C8 = −6.06674e−014, C10 = 4.52640e−017

Various Kinds of Data

| Focal Length | 390.00 |
|---|---|
| F-Number | 8.20 |
| Half Field Angle (°) | 3.18 |
| Image Height | 21.64 |
| Total Length of Lens | 250.00 |
| BF | 92.99 |

| | Focusing on Object at Infinity | Focusing on Object at Distance of 5 m |
|---|---|---|
| d5 | 27.12 | 11.75 |
| d7 | 10.01 | 25.37 |

| Position of Entrance Pupil | 296.21 |
|---|---|
| Position of Exit Pupil | −51.13 |
| Front Principal Point Position | −369.19 |
| Rear Principal Point Position | −297.01 |

Lens Unit Data

| Lens Unit | Starting Surface | Focal Length | Lens Structure Length | Front Principal Point Position | Rear Principal Point Position |
|---|---|---|---|---|---|
| L1 | 1 | 359.56 | 65.44 | −215.08 | −172.39 |
| L2 | 6 | 247.97 | 1.62 | −0.01 | −1.08 |
| L3 | 8 | −169.97 | 52.84 | 11.45 | −40.40 |

Table 1 summarizes various values in the numerical examples.

TABLE 11

| | First Numerical Example | Second Numerical Example | Third Numerical Example | Fourth Numerical Example | Fifth Numerical Example |
|---|---|---|---|---|---|
| Conditional Expression (1) | −0.16 | −0.18 | −0.11 | −0.24 | −0.44 |

TABLE 11-continued

| | First Numerical Example | Second Numerical Example | Third Numerical Example | Fourth Numerical Example | Fifth Numerical Example |
|---|---|---|---|---|---|
| Conditional Expression (2) | 0.79 | 0.61 | 0.63 | 0.79 | 0.92 |
| Conditional Expression (3) | 0.55 | 0.61 | 0.50 | 0.57 | 0.64 |
| Conditional Expression (4) | 0.27 | 0.63 | 0.27 | 0.59 | 0.64 |
| Conditional Expression (5) | −0.21 | −0.90 | −0.22 | −0.21 | −0.25 |
| Conditional Expression (6) | 31.30 | 31.30 | 32.30 | 33.30 | 28.50 |
| Conditional Expression (7) | 25.90 | 27.40 | 28.80 | 31.50 | 30.60 |
| Conditional Expression (8) | 0.21 | 0.26 | 0.16 | 0.23 | 0.24 |

[Imaging Apparatus]

Figure 11:
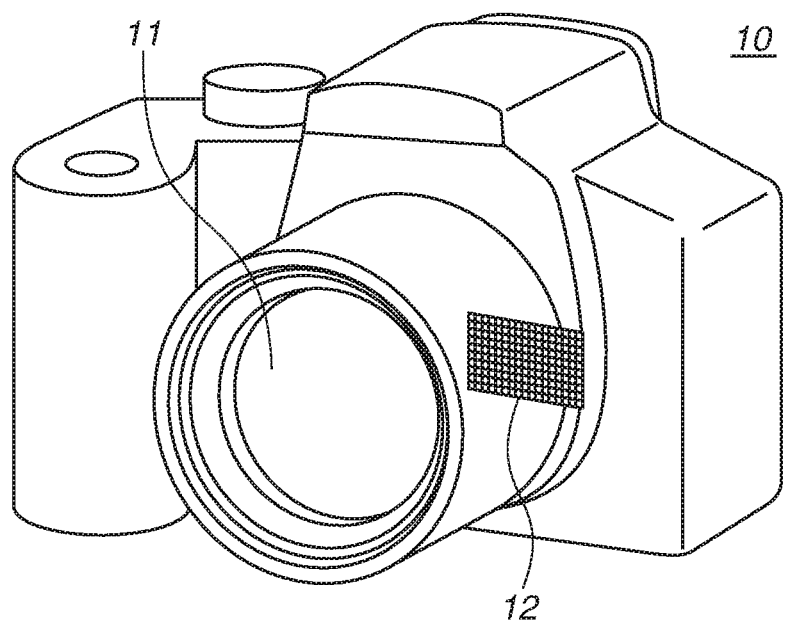
FIG. 11 is a schematic diagram illustrating an imaging apparatus.

Next, an exemplary embodiment of a digital still camera (i.e., imaging apparatus) that uses the optical system according to any of the exemplary embodiments as the imaging optical system is described with reference to FIG. 11. In FIG. 11, a camera body 10 and an imaging optical system 11 including the optical system described in any of the first to fifth exemplary embodiments are illustrated. A solid-state imaging device (i.e., photoelectric conversion device) 12, which is a CCD sensor, a CMOS sensor or the like, is incorporated in the camera body 10. The solid-state imaging device 12 receives and photoelectrically converts an optical image formed by the imaging optical system 11. The camera body 10 may be a so-called single-lens reflex camera including an instant return mirror, or a so-called mirrorless camera not including an instant return mirror.

As described above, the optical system according to any of the exemplary embodiments is applied to the imaging apparatus such as a digital still camera, which makes it possible to achieve a small-sized and lightweight imaging apparatus having an excellent optical performance less changed in focusing.

Although the exemplary embodiments and the numerical examples of the present invention have been described above, the present invention is not limited to the exemplary embodiments and the numerical examples, and various combinations, modifications, and alternations can be made within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-093366, filed May 14, 2018, which is hereby incorporated by reference herein in its entirety.

What is claimed is:

1. An optical system comprising a first lens unit having positive refractive power, a second lens unit having positive refractive power, and a third lens unit having negative refractive power that are arranged in order from an object side to an image side, wherein:

during focusing, the second lens unit moves such that distances between adjacent lens units on the optical axis of the optical system change, and the first lens unit consists of a diffractive optical element and a negative lens that are arranged in order from the object side to the image side, the negative lens being a single lens and having a meniscus shape in which a concave surface faces the object side.

2. The optical system according to claim 1, wherein the following conditional expression is satisfied:

$$-0.55 < f3/f < -0.06,$$

where f3 is a focal length of the third lens unit, and f is a focal length of the optical system.

3. The optical system according to claim 1, wherein the following conditional expression is satisfied:

$$0.50 < f1/f < 1.00,$$

where f1 is a focal length of the first lens unit, and f is a focal length of the optical system.

4. The optical system according to claim 1, wherein the following conditional expression is satisfied:

$$0.40 < L/f < 0.70,$$

where L is a total length of the optical system, and f is a focal length of the optical system.

5. The optical system according to claim 1, wherein the following conditional expression is satisfied:

$$0.18 < f2/f < 0.75,$$

where f2 is a focal length of the second lens unit, and f is a focal length of the optical system.

6. The optical system according to claim 1, wherein the following conditional expression is satisfied:

$$-1.00 < fn/f < -0.15,$$

where fn is a focal length of the negative lens, and f is a focal length of the optical system.

7. The optical system according to claim 1, wherein the following conditional expression is satisfied:

$$27.0 < vn < 41.0,$$

where vn is an Abbe number of the negative lens with respect to a d-line.

8. The optical system according to claim 1, wherein the following conditional expression is satisfied:

$$20.0 < fdoe/f < 40.0,$$

where fdoe is a focal length of a diffractive surface of the diffractive optical element, and f is a focal length of the optical system.

9. The optical system according to claim 1, wherein the following conditional expression is satisfied:

$$0.10 < skd/f < 0.40,$$

where skd is a back focus of the optical system, and f is a focal length of the optical system.

10. The optical system according to claim 1, wherein the second lens unit consists of one positive lens.

11. An imaging apparatus including:
an optical system, and
an imaging device configured to photoelectrically convert an optical image formed by the optical system,
wherein the optical system comprising a first lens unit having positive refractive power, a second lens unit having positive refractive power, and a third lens unit having negative refractive power that are arranged in order from an object side to an image side, wherein, during focusing, the second lens unit moves and each distance between adjacent lens units on an optical axis changes, and wherein the first lens unit consists of a diffractive optical element and a negative lens that are arranged in order from the object side to the image side, the negative lens being a single lens and having a meniscus shape in which a concave surface is directed to the object side.

12. The imaging apparatus according to claim 11, wherein, in the optical system, the following conditional expression is satisfied:

$-0.55<f3/f<-0.06$, where f3 is a focal length of the third lens unit, and f is a focal length of the optical system.

13. The imaging apparatus according to claim 11, wherein, in the optical system, the following conditional expression is satisfied:

$0.50<f1/f<1.00$, where f1 is a focal length of the first lens unit, and f is a focal length of the optical system.

14. The imaging apparatus according to claim 11, wherein, in the optical system, the following conditional expression is satisfied:

$0.40<L/f<0.70$, where L is a total length of the optical system, and f is a focal length of the optical system.

15. The imaging apparatus according to claim 11, wherein, in the optical system, the following conditional expression is satisfied:

$0.18<f2/f<0.75$, where f2 is a focal length of the second lens unit, and f is a focal length of the optical system.

16. The imaging apparatus according to claim 11, wherein, in the optical system, the following conditional expression is satisfied:

$-1.00<fn/f<-0.15$, where fn is a focal length of the negative lens, and f is a focal length of the optical system.

17. The imaging apparatus according to claim 11, wherein, in the optical system, the following conditional expression is satisfied:

$27.0<vn<41.0$, where vn is an Abbe number of the negative lens with respect to a d-line.

18. The imaging apparatus according to claim 11, wherein, in the optical system, the following conditional expression is satisfied:

$20.0<fdoe/f<40.0$, where fdoe is a focal length of a diffractive surface of the diffractive optical element, and f is a focal length of the optical system.

19. The imaging apparatus according to claim 11, wherein, in the optical system, the following conditional expression is satisfied:

$0.10<skd/f<0.40$, where skd is a back focus of the optical system, and f is a focal length of the optical system.

20. The imaging apparatus according to claim 11, wherein the second lens unit consists of one positive lens.

* * * * *